United States Patent
Foeldesi et al.

(10) Patent No.: US 8,407,183 B2
(45) Date of Patent: Mar. 26, 2013

(54) BUSINESS INTELLIGENCE DATA EXTRACTION ON DEMAND

(75) Inventors: Gabi Foeldesi, Bad Schoenborn/Mingolsheim (DE); Peter Haerle, Walldorf (DE)

(73) Assignee: SAP AG, Walldorf (DE)

( * ) Notice: Subject to any disclaimer, the term of this patent is extended or adjusted under 35 U.S.C. 154(b) by 384 days.

(21) Appl. No.: 11/963,752

(22) Filed: Dec. 21, 2007

(65) Prior Publication Data

US 2009/0164486 A1 Jun. 25, 2009

(51) Int. Cl.
*G06F 7/00* (2006.01)

(52) U.S. Cl. .......................... 707/611; 707/656; 707/640

(58) Field of Classification Search .......................... None
See application file for complete search history.

(56) References Cited

U.S. PATENT DOCUMENTS

| | | | |
|---|---|---|---|
| 6,640,244 B1 * | 10/2003 | Bowman-Amuah | 709/207 |
| 7,437,355 B2 * | 10/2008 | Plate | 1/1 |
| 7,478,118 B2 * | 1/2009 | Tysowski et al. | 1/1 |
| 7,509,350 B2 * | 3/2009 | Linkert et al. | 1/1 |
| 7,526,575 B2 * | 4/2009 | Rabbers et al. | 709/248 |
| 2003/0084017 A1 * | 5/2003 | Ordille | 707/1 |
| 2005/0120051 A1 * | 6/2005 | Danner et al. | 707/104.1 |
| 2007/0061266 A1 * | 3/2007 | Moore et al. | 705/51 |
| 2008/0134211 A1 * | 6/2008 | Cui | 719/318 |
| 2008/0154900 A1 * | 6/2008 | Matsumoto et al. | 707/7 |
| 2008/0189438 A1 * | 8/2008 | Zimmerer et al. | 709/246 |
| 2009/0240663 A1 * | 9/2009 | Plattner et al. | 707/3 |

OTHER PUBLICATIONS

SAP America, How to . . . CO-PA Extraction, 2003.*

* cited by examiner

*Primary Examiner* — Apu Mofiz
*Assistant Examiner* — Thu Nga Nguyen
(74) *Attorney, Agent, or Firm* — Mintz Levin Cohn Ferris Glovsky and Popeo, P.C.

(57) ABSTRACT

Methods and apparatus, including computer program products, for business intelligence data extraction on demand. In general, a first request is sent from a first system to a second system for a query of a data structure to include indications of updates at the second system to data at both the first and second systems. An indication of an update at the second system is received in response to the first request, where the indication includes an identification of updated data. A second request is sent to a database data structure of the second system for data corresponding to the updated data. The updated data is received at the first system in response to the second request. Data is updated at the first system in accordance with the updated data in response to the receiving the updated data.

18 Claims, 4 Drawing Sheets

BUSINESS INTELLIGENCE DATA EXTRACTION ON DEMAND

BACKGROUND

The present disclosure relates to data processing by means of a digital computer, and more particularly to business intelligence data extraction on demand.

In general, an enterprise system landscape may include a business intelligence system, which may be used for collection, integration, analysis, and presentation of business information. For example, SAP AG's NetWeaver enterprise solution includes a business intelligence solution named SAP NetWeaver Business Intelligence which allows for analytics, including reporting.

Applications of a business intelligence system may retrieve data through queries. One method of providing a query service in a business intelligence system may include performing OLAP (online analytical processing) queries of a multi-dimensional nature. Applications of OLAP may include business reporting (e.g., for sales, marketing, and management); business process management (BPM); budgeting and forecasting; financial reporting; and the like.

To perform the queries, a database data structure of a business intelligence system may be configured for multidimensional queries by conforming to a multidimensional data model and that database data structure may receive information from other data sources, such as an online transaction processing (OLTP) database system which may store data in two dimensions with drill-down capabilities. In general, the OLAP data that results from OLAP is generated from data imported from data sources, such as an OLTP data source, that may be on another system, which may be remotely located. For an OLAP system, obtaining information for an OLAP query may involve requests for OLTP data and performing transformations on OLTP data to generate OLAP data.

SUMMARY

The subject matter disclosed herein provides methods and apparatus, including computer program products, that implement techniques related to business intelligence data extraction on demand.

In general, a first request is sent from a first system to a second system for a query of a data structure to include indications of updates at the second system to data at both the first and second systems. An indication of an update at the second system is received in response to the first request, where the indication includes an identification of updated data. A second request is sent to a database data structure of the second system for the updated data. The updated data is received at the first system in response to the second request. Data is updated at the first system in accordance with the updated data in response to the receiving the updated data.

The subject matter may be implemented as, for example, computer program products (e.g., as source code or compiled code tangibly embodied in computer-readable media), computer-implemented methods, and systems.

Variations may include one or more of the following features.

The first system may be a business intelligence system including an OLAP data source from which reports are generated and the second system may include an OLTP data source.

The data structure may be a database data structure, which may be a table. The data structure may be a part of a database data structure where the updated object is stored.

The first request may be triggered as part of a periodic set of requests.

An indication of the update may be stored in the data structure in response to a change to the updated object at the second system.

The indication of the update may be removed in the data structure in response to first system receiving the updated data.

The data that is received in response to a request for updated data corresponding to the indication of an update may be a delta update or a data structure comprising changed and unchanged objects.

The subject matter described herein can be implemented to realize one or more of the following advantages. Updates of data in one system may be stored in a data structure such that another system may request indications of updates without requesting the actual data which may result in a decrease of communication overhead and thus to a higher actuality of the replicated data. When updates to objects stored in a system are requested, only that data that is updated may be received, as only that information that is indicated as being updated may be requested.

Details of one or more implementations are set forth in the accompanying drawings and in the description below. Further features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
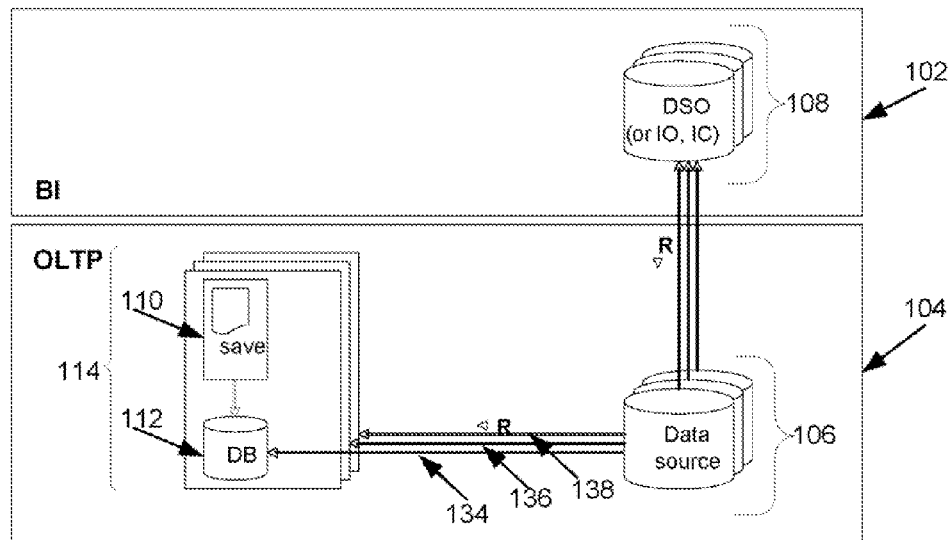
FIG. 1A is a block diagram of a system to retrieve data for OLAP (online analytical processing) queries from data sources of another system by performing a full extraction of data from the data sources.
Figure 1B:
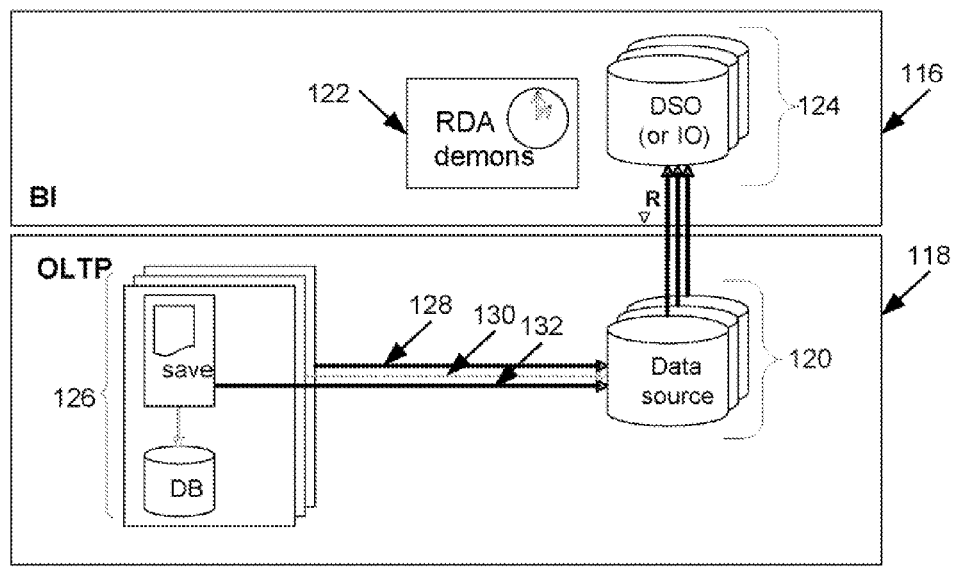
FIG. 1B is a block diagram of a system to retrieve data for OLAP queries from data sources of another system by performing an extraction of delta data from the data sources.
Figure 2A:
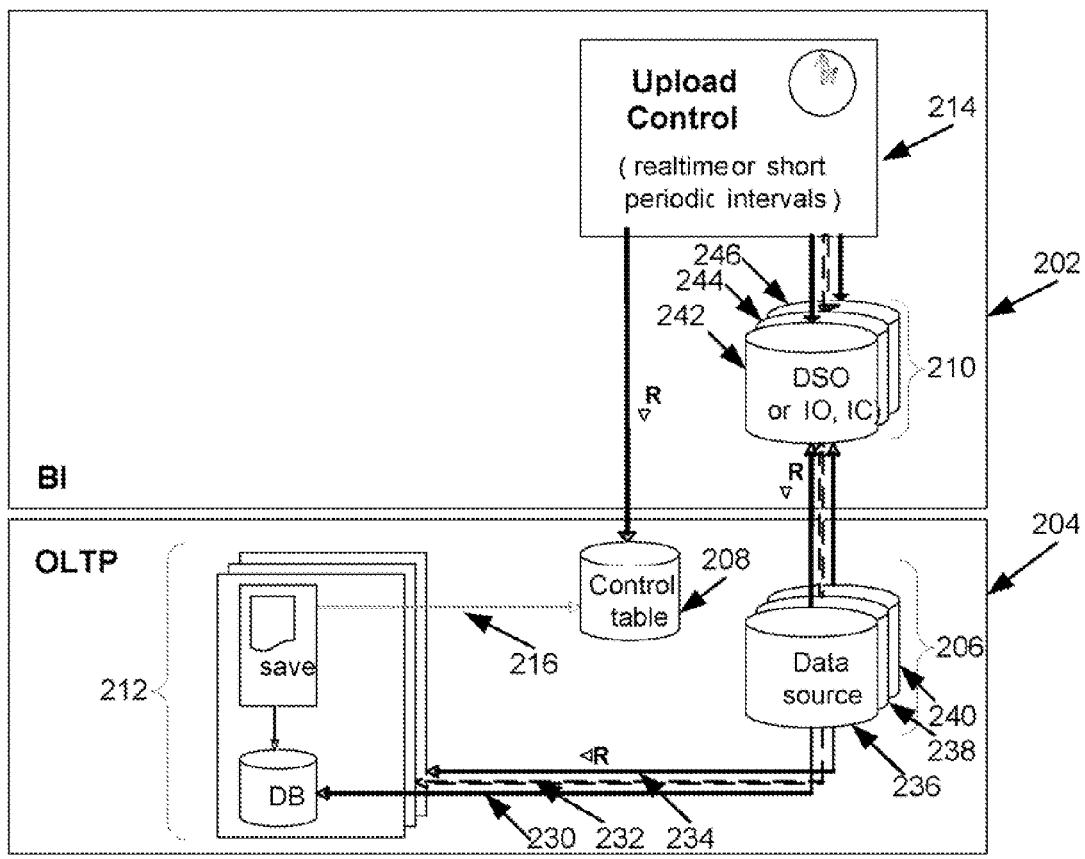
FIG. 2A is a block diagram of a system to retrieve data for OLAP queries from data sources of another system by performing a full extraction of data from the data sources in accordance with a control table.
Figure 2B:
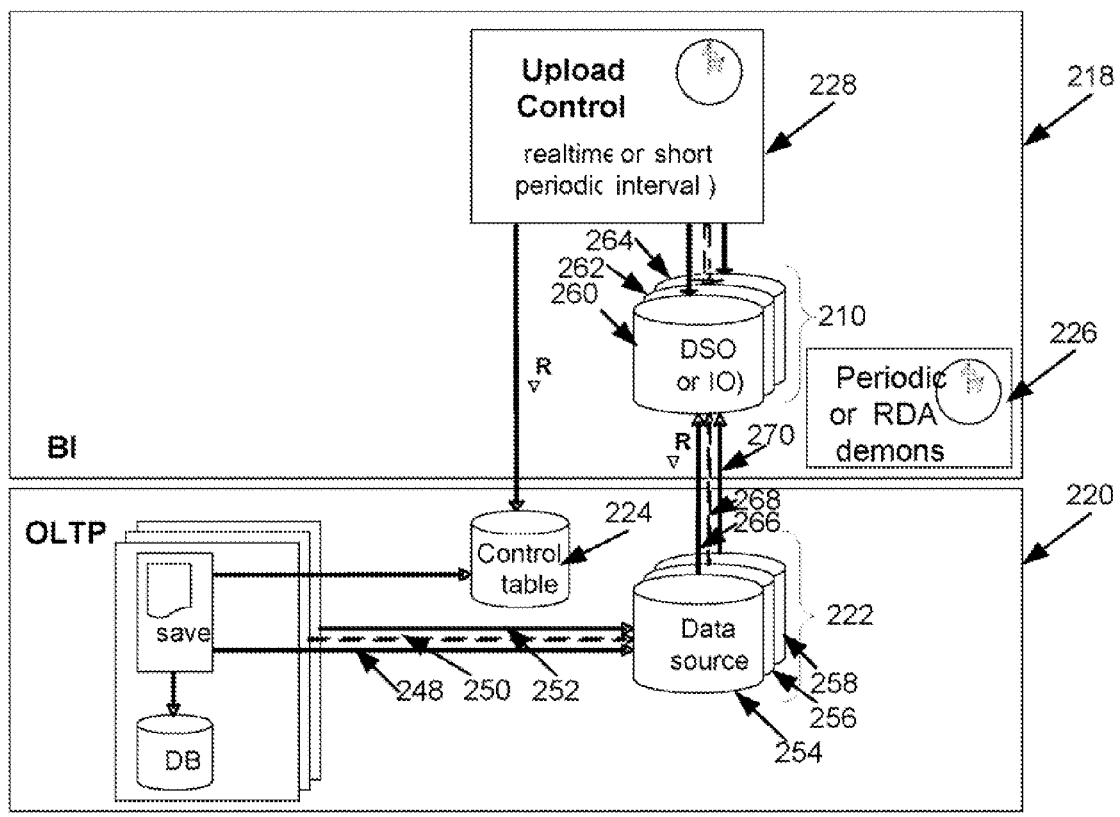
FIG. 2B is a block diagram of a system to retrieve data for OLAP queries from data sources of another system by performing extraction of delta data from the data sources in accordance with a control table.
Figure 3:
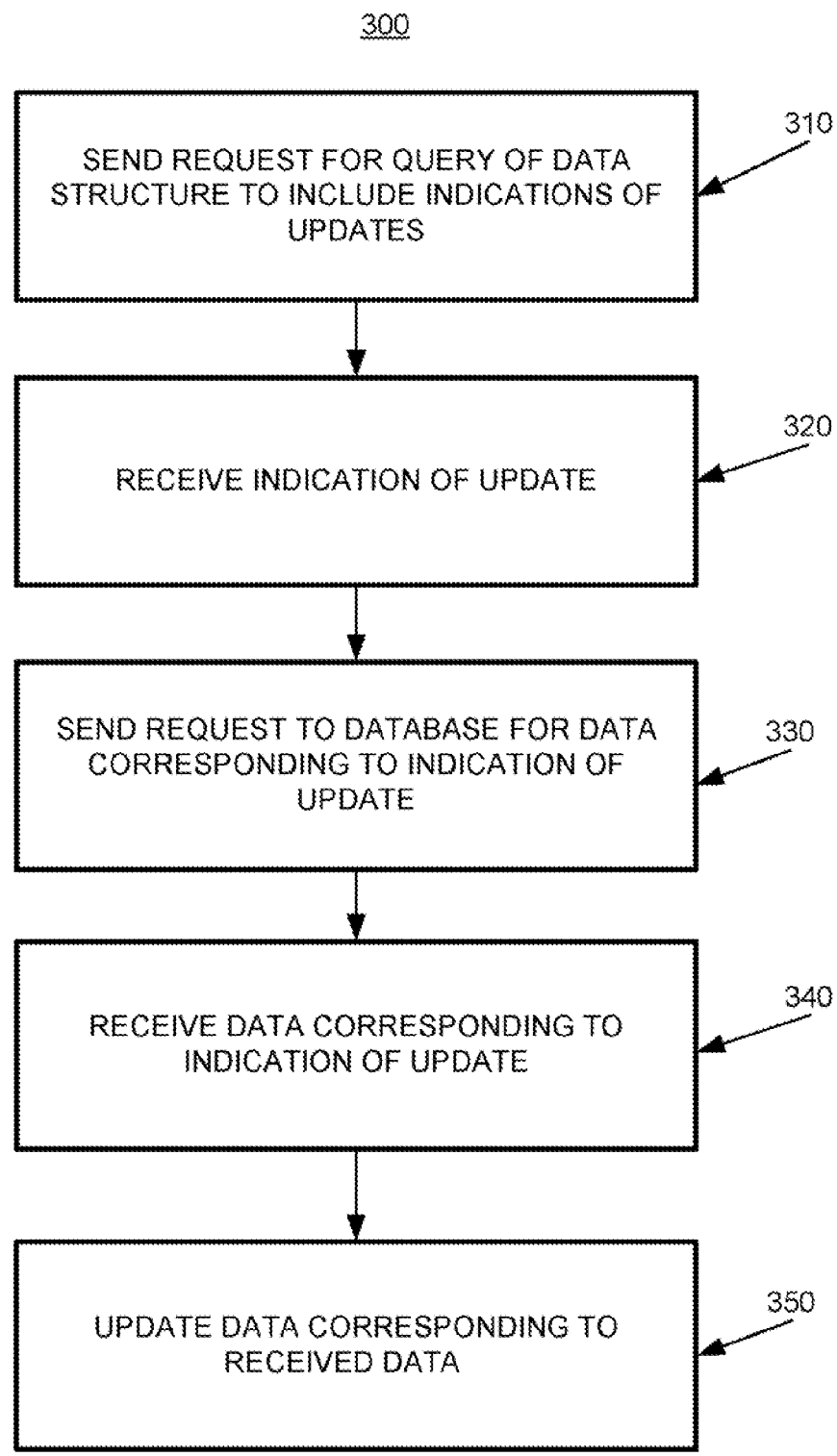
FIG. 3 is a flowchart illustrating a process to extract data from a data source in accordance with a data structure indicating changes to data at the data source.

In general, FIGS. 1-3 involve extraction of data from a source system to a target system where the source system is an OLTP (online transaction processing) system and the target system is an OLAP (online analytical processing) system. The technique of extraction described with reference to FIGS. 2-3 may be referred to as extraction on demand; whereas the technique of extraction described with reference to FIGS. 1A-1B might not be referred to as including extraction on demand. The extraction of FIGS. 1A-1B includes an extraction of the data from data sources regardless whether they contain any changed data; whereas extraction on demand may refer to a selective extraction of the data from only those data sources which do contain some changed data.

FIG. 1A is a block diagram of a system 102 to retrieve data for OLAP queries from data sources 106 of another system 104 by performing a full extraction of data from the data sources. In general, the first system 102 is a business intelligence system that may perform OLAP queries. The queries may be performed to obtain data for analytics applications which may process results of the queries and provide data to users. For example, a query may be run for a reporting application and results of the query may be incorporated in a report. The second system 104 is an OLTP (online transaction processing) system that may be used to obtain data for the queries of the first system 102.

In general, operation of the first system 102 with the second system 104 may be as follows. An application may query the DSO (DataStore object)s 108 for data for a query. The DSOs 108 may contain the data as part of its datasets and may provide a result of the query to the application. The datasets of the DSOs 108 may be defined as part of the process of generating the DSOs 108 and population of the DSOs 108 may be handled by the first system 102 (e.g., by the DSOs 108 or other components of the first system 102). To populate the DSOs 108, full extraction of data from the data sources 106 of the second system 104 to the first system 102 may be performed. Full extraction of data to the second system 104 involves an extraction of all data necessary to populate the DSOs 108, including any changes to data (e.g., that may be a result of the save 110 to the database 112) and unchanged data, with data provided by the data sources 106, where data may be provided to the data sources 106 by a read of the databases of the applications 114.

As discussed above, the OLTP system 104 includes the data sources 106 and OLTP applications 114. Each of the OLTP applications 114 may have one or more respective database tables to which saves of data may be performed. Changes to data represented by the saves (e.g., creations or alterations) may be read to the data sources 106, which may act as a central repository for the applications 114. The data sources 106 may be database data structures, such as tables; may store transactional data; and may store data in flat relational database data structures. The data sources 106 may be data sources in the sense of SAP datasources that contain a number of logically-related fields that are arranged in a flat structure and contain data to be transferred into a BI system. The OLTP system 104 may be a system such as SAP AG's R/3 or ERP (Enterprise Resource Planning) system. The BI system 102 may be SAP AG's BI, or any other Business Intelligence system.

FIG. 1B is a block diagram of a system 116 to retrieve data for OLAP queries from data sources 120 of another system 118 by performing an extraction of delta data from the data sources 120. In general, the systems 116, 118 of FIG. 1B differs from the systems 102, 104 of FIG. 1A by being an application of extraction of delta data, where delta data is stored in delta buffers represented by the data sources 120, rather than full extraction of data where changed and unchanged data may be extracted. In particular, in a delta modus (e.g., as described with reference to FIG. 1B), all relevant changes of the application may be posted to a data source (which may more particularly be a delta queue or delta buffer of a data source infrastructure) where the data are queued in an OLTP system and with a next request for delta replication (which may be triggered from a BI system) these data will be read and extracted to a BI system. In contrast to a delta modus, in a full extraction or full upload modus (e.g., as described with reference to FIG. 1A) no data are posted to a data source. Instead, when a full upload is requested by a BI system, the data source itself may call an application and request all relevant data (which may be indicated by the different directions of the horizontal arrows 134, 136, 138 of FIG. 1A and the horizontal arrows 128, 130, 132 of FIG. 1B) and the data source may pass the data to BI, but does not need store the data itself. An implementation with delta buffers may involve use of RDA (real-time data acquisition) demons 122. An implementation of extraction of delta data in accordance with FIG. 1B may be combined with an implementation of full extraction of data in FIG. 1A.

In general operation of the first and second systems 116, 118 may be as follows. The RDA demons 122 may be demons in the sense of being portions of a program that are not invoked explicitly, but lay dormant waiting for one or more conditions to occur. The conditions may include a periodic timer where the RDA demons 122 are invoked after some time has passed or conditions related to updating reporting figures in a report (e.g., after so many sales orders have been processed a particular report may require updating). When invoked, the RDA demons 122 may cause a read of the data sources 120 to DSOs 124 for deltas in the data sources 120. The data sources 120 may be populated with deltas from applications 126, as indicated by data flow lines 128, 130, 132. A first and third data flow lines 128, 132 may be solid to indicate applications from the applications 126 that cause deltas to be sent to the data sources 120, whereas a second data flow line may be dashed to indicate that no delta is sent by a particular application. That some of the applications have deltas while others might not may be a reflection that only some of the applications 126 make changes to data to cause deltas to be generated. Extraction of data from the data sources 120 to the DSOs 124 might not be considered an on-demand extraction as the RDA demons 122 may request a read of all data sources 120 regardless of whether deltas exist (i.e. new deltas, which may be changes to object instances that have been posted since a last call for delta extraction). In general, the deltas may be changed object instances of a data source.

FIG. 2A is a block diagram of a system 202 to retrieve data for OLAP queries from data sources 206 of another system 204 by performing extraction of data from the data sources 206 in accordance with a control table 208. Extraction of data from the second system 204 to the first system 202 of FIG. 2A may differ from the extraction from the second system 104 to the first system 102 of FIG. 1A in that use of the control table 208 may allow for what might be referred to as extraction on demand.

In general, operation of the first and second systems 202, 204 may be as follows. When saves are performed by one of the applications 212 of the second system 204, an indication of a change of data may be stored in the control table 208 as indicated by a first data flow arrow 216. The indication of a change may include an indication of a data source which contains changed data. In response to a trigger, such as a trigger related to a time interval or a trigger related to a request for a query from a reporting application, an upload control component 214 may request a read of the control table 208 in response to which the control table 208 may return a list of indications of changes (e.g., a list of data sources which contain one or more object instances that have been changed), if any. If there are no indications of changes returned to the upload control component 214 data may simply be queried from the DSOs 210 without any requests of data from the data sources 206. Otherwise, if there are indications of changes returned to the upload control component 214, the upload control component 214 may cause only those DSOs 210 for which some object instances have been changed to request objects corresponding to the indications of changes from the data sources 206. For example, only those DSOs 210 for which some object instances have been changed may cause a request of all data sources that include changes objects as indicated in a list of data sources retrieved from the control table 208. This extraction may include both changed and unchanged objects from the selected data sources. For example, in FIG. 2A the first and third arrows 230, 234 may be solid to indicate that changes have occurred to objects in the first and third data sources 236, 240, which may result in updates sent to the first and third DSOs 242, 246. By contrast the second arrow 232 may be dashed to indicate that changes have not occurred to objects in the second data source 238 such that updates might not result at the second DSO 244.

After a successful read of the control table 208 has been performed (or, e.g., after a successful read of data in the data sources 206), the control table 208 may be emptied to receive further indications of changes and the general operation may repeat.

Although not shown, as discussed above the first system 202 may include a business intelligence application that relies on data from the DSOs 210. For example, a reporting application program may be part of the first system 202.

The upload control component 214 may be a software component that is part of the first system 202. In particular, the upload control component 214 may be part of an application platform on which applications that use business intelligence data from the first system 202 may be built.

The control table 208 need not be a table and may be any type of data structure. Also, the control table 208 need not be separate from the data sources 206 and may be integrated with the data sources 206. Data stored in the control table may be, for example, a list of data sources which contain one or more object instances more that have changed. As discussed above, the control table 208 may be updated as changes to data are to be saved (i.e., persisted) to a database.

Use of the control table 208 in combination with the upload control component 214 and a request of only those resources that are changed may reduce an overhead of extraction processes for loading data to BI which may improve performance. Furthermore, the actuality of data may be improved (e.g. for such data sources that would not be extracted in short periods, due to higher administrative or system effort in other full extraction processes).

For example, fewer communications between the first and second system 202, 204 may be performed as data may only be requested from those data sources 206 for which changes are posted in the control table 208 (i.e. data source 236 and 240). As another example, less data may be communicated between the first and second system 202, 204 as only objects for those data sources which do contain changed objects may be requested by, and transferred to, the first system 202, in contrast to an implementation of full extraction similar to the full extraction described with reference to FIG. 1A.

As a consequence of reduced communication overhead it may be possible to enable a frequent extraction of many data sources by using extraction on demand, which may have the effect that data may be more up to date in the first system 202 compared to a full extraction in a system similar to the first system 102 of FIG. 1A. For example, calls to the control table 208 may be performed frequently (e.g., every few minutes) and a performance impact (e.g., time spent communicating with the second system 204) resulting from the frequent calls may be far less of an impact than a performance impact resulting from periodic calls to cause a full extraction of data similar to the full extraction described with reference to FIG. 1A such that data may be updated more frequently in the first system 202 while attaining similar or better performance goals.

FIG. 2B is a block diagram of a system 218 to retrieve data for OLAP queries from data sources 222 of another system 220 by performing extraction of delta data from the data sources 222 in accordance with a control table 224. The first and second systems 218, 220 of FIG. 2B differ from the first and second systems 202, 204 of FIG. 2A in that the first and second systems 218, 220 involve an application of extracting delta data from data sources that are delta buffers and the first system 218 includes demons 226 that may be used to make calls (e.g., periodic or RDA calls) to extract delta data from the data sources 222.

Similar to operation of the first and second systems 202, 204 of FIG. 2A, the first and second systems 218, 220 of FIG. 2B may use a component, such as an upload control component 228, to check a control table, such as a control table 224, to determine whether updates have occurred to data represented by data structures at the first system 218. The control table 224 may be populated with an indication that a delta has been sent to a delta buffer represented at the data sources 222 when a change is persisted to a database of an application and the delta data is sent to the delta buffer. Only if a change is indicated in a response received by the control table 224 may the upload control component 228 cause retrieval of delta updates from only those data sources 222 to the DSOs 210 which contain one or more object instances that have changed. If the delta data updates are retrieved, the control table 224 may be cleared of entries related to the retrieved delta data.

Similar to a selective extraction of data by the first system 202 of FIG. 2A, the first system 218 may perform a selection of only those data sources that contain delta data as indicated in the control table 224. As a consequence, a burden of tasks on the demons 226 may be reduced.

In contrast to the second systems 118 of FIG. 1B, the second system 220 of FIG. 2B includes a control table 224, as discussed above. The control table 224 may be used to determine those data sources 222 from which requests for deltas may be made. As only those data sources from which deltas are indicated to exist by the control table 224 may be requested, an amount of communications between the first system 218 and the second system 220 of FIG. 2B may be fewer than communications between the first system 116 and the second system 118 of FIG. 1B. For example, a request for deltas need not be made to a data source where delta data does not exist. FIG. 2B includes solid and dashed arrows to indicate where reads of data might not take place. For example, in FIG. 2B the first and third arrows 248, 252 may be solid to indicate that deltas have been posted in the first and third data sources 254, 258, which may result in deltas that may be requested by and transferred to the first and third DSOs 260, 264 as indicated by the first and third solid lines 266, 270 from the first and third data sources 254, 258 to the first and third DSOs 260, 264. By contrast, the second arrow 250 may be dashed to indicate that deltas have not been posted to the second data source 256 such that deltas need not be requested by and transferred to the second DSO 262, as indicated by the second line 268, which is dashed, from the second data source 256 to the second DSO 262.

Processes described with reference to FIGS. 1A, 1B, 2A, and 2B may be referred to as a pull of data, since a first system is requesting data from a second system that has the data (e.g., the first systems 102, 116, 202, 218 request data from the second systems 104, 118, 204, 220, respectively), in contrast to a push of data, where a second system posts data to the first system (e.g., were the second systems 104, 118, 204 220 to directly post data to the first systems 102, 116, 202, 218, respectively). Although a push process may have many advantages compared to a pull process, such as reducing latency or overhead in uploading, since data could be posted directly from, for example, the second system 204 to the first system 202 (e.g., from OLTP to BI) when the change occurred, a pull of data, for example, from the first system 202 to the second system 204, may be performed instead of a push of data as a result of a combination of factors. For example, a push process might not be used because it might not be guaranteed that the target system is available, so in such a case a push extraction might be 'lost' or an extraction, such as SAP AG's BI extraction, may only support a pull process. Consequently, extraction on demand may be an advantage for cases where a push process cannot be used.

FIG. 3 is a flowchart illustrating a process 300 to extract data from data sources in accordance with a data structure indicating changes to data at the data sources. In general, the process 300 involves sending a request for a query of a data structure to include indications of updates (310), receiving an indication of an update (320), sending a request to a database for data corresponding to indication of an update (330), receiving data corresponding to an indication of an update (340), and updating data corresponding to received data (350). The process 300 may be performed in the systems 202, 218 of FIGS. 2A-2B.

A request for a query of a data structure to include indications of updates is sent (310). Sending the request may include performing a query to the data structure. The request may be from a first system to a second system, where the first system may be a business intelligence system and the second system may be an OLTP system. The data structure may be a table or other data structure, and may be a data structure that includes data representing the changes themselves (e.g., delta data or changed objects). The data structure may include indications of updates at the second system to data at both the first and second systems. The indications may indicate for which applications changes occurred that were posted to data sources in the second system. For example, the indications may be a list of data sources where changes have occurred for which an extraction (full or delta) may be triggered. Updates may include generation of new data or altering of data (e.g., modifying a data from one value to another value). The request may be sent in response to a trigger which may be based on a timer or another condition. The request may be sent by an upload control component of a business intelligence system.

An indication of an update is received (320). The indication may be received as part of a list of indications of updates. The indication may identify one or more data sources that contain changed object instances. The indication may be sent in response to the request of the sub-process of 310. The indication may be received at an upload control component of a business intelligence system.

A request is sent to a database for data corresponding to indication of an update (330). The request may include a list of data identified by a list of received indications. The request may be sent in response to receiving the indication of an update or in response to another trigger. If no indication of an update is received, no request might be made. As an example of the sub-process 330, a business intelligence system may send a list identifying those data sources that contain changed object instances, where the delta data was identified in a response to a request for only those delta data that are new with respect to the business intelligence system.

Data corresponding to an indication of an update is received (340). The data may be received in response to the request of the sub-process 330. The data may include results of a query corresponding to the request. For example, results of a query to the data sources 206 of FIG. 2A.

Data corresponding to received data is updated (350). The data may be updated in accordance with the data corresponding to the updated data source in response to the receiving the data. For example, if sales data is changed by one of the applications 212, the changes retrieved by the data sources 206 may be sent to the DSOs 210 where data corresponding to the sales data may be updated in response to receiving the changes.

Although the block diagrams of FIGS. 1-2 include a certain number and type of components, implementations may vary. For example, the DSOs of FIGS. 1-2 may be InfoObjects (which may be a basic information providers of the business intelligence systems, where InfoObjects enable information to be modeled in a structured form and can represent characteristics, key figures, units, and time), InfoCubes (which may be a central data store for reports and evaluations, where after loading master data into InfoObjects, transactional data may be loaded into InfoCubes, and InfoCubes may consist of facts, or transaction data, and then the technical keys that link to the relevant master data texts and attributes useful in reporting and analysis), or other types of data structures of a multidimensional data model. As another example, there may be multiple control tables with a control table for each system that requests data from an OLTP system such that each system may receive a list of updates that pertain to that system and selectively request only those updates that would be new to that system. As another example, the applications of the OLTP systems 104, 118, 204, 220 may be parts of an application, such as a tool. As another example, although extraction on demand is described with reference to extraction from an OLTP system to a BI system, similar techniques, mechanisms, or both, such as a control table, may be implemented in other systems (e.g., extraction of data between two other types of systems).

Similarly, although the process 300 of FIG. 3 includes a certain number and type of sub-processes, implementations may vary. For example, the process 300 may further include storing an indication of a change to a data object at the data structure.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, i.e., one or more computer programs tangibly embodied in an information carrier, e.g., in a machine-readable storage device, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Media suitable for embodying computer program instructions and data include all forms of volatile (e.g., random access memory) or non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other in a logical sense and typically interact through a communication network. The relationship of client and server arises by virtue of computer programs running on the respective computers and having a client-server relationship to each other.

The subject matter described herein has been described in terms of particular embodiments, but other embodiments can be implemented and are within the scope of the following claims. For example, operations can differ and still achieve desirable results. In certain implementations, multitasking and parallel processing may be preferable. Other embodiments are within the scope of the following claims

What is claimed is:

1. A computer-implemented method comprising:
    sending a first request from an upload control component of a target system to a control table of a source system for a query of the control table, the query being performed to provide one or more indications of one or more data updates available at the source system;
    receiving at the upload control component of the target system the one or more indications of one or more data updates available at the source system in response to the first request, the one or more indications identifying at least one data source of the source system containing the one or more data updates;
    sending a second request from one or more data storage objects of the target system to the at least one data source of the source system for the one or more data updates contained in the at least one data source;
    receiving at the one or more data storage objects of the target system the one or more data updates of the at least one data source in response to the second request; and
    updating data in the one or more data storage objects of the target system with the one or more data updates of the at least one data source in response to receiving the one or more data updates from the at least one data source of the source system.

2. The method of claim 1, wherein the target system is an online analytical processing system from which reports are generated and the source system is an online transaction processing system.

3. The method of claim 1, wherein the one or more data updates available at the source system correspond to data at both the target system and the source system.

4. The method of claim 1, wherein the first request is sent in response to a trigger related to a time interval or a request for a query from a reporting application.

5. The method of claim 1, further comprising:
    storing in the control table the one or more indications of the one or more data updates in response to a change in one or more object instances contained in the at least one data source of the source system; and
    removing the one or more indications of the one or more data updates from the control table when the target system has received the one or more data updates.

6. The method of claim 1, wherein receiving the one or more data updates comprises receiving a delta update of a data object.

7. The method of claim 1, wherein the at least one data source provides data for a full upload.

8. The method of claim 1, wherein the at least one data source stores delta updates of one or more data objects.

9. A non-transitory computer program product, tangibly embodied on a computer-readable medium, the product comprising instructions to cause a data processing apparatus to perform operations comprising:
    sending a first request from an upload control component of a target system to a control table of a source system for a query of the control table, the query being performed to provide one or more indications of one or more data updates available at the source system;
    receiving at the upload control component of the target system the one or more indications of one or more data updates available at the source system in response to the first request, the one or more indications identifying at least one data source of the source system containing the one or more data updates;

sending a second request from one or more data storage objects of the target system to the at least one data source of the source system for the one or more data updates in the at least one data source;

receiving at the one or more data storage objects of the target system the one or more data updates of the at least one data source in response to the second request; and updating data in the one or more data storage objects of the target system with the one or more data updates of the at least one data source in response to receiving the one or more data updates from the at least one data source.

10. The product of claim 9, wherein the target system is an online analytical processing system from which reports are generated and the source system is an online transaction processing system.

11. The product of claim 9, wherein the one or more data updates available at the source system correspond to data at both the target system and the source system.

12. The product of claim 9, wherein the first request is sent in response to a trigger related to a time interval or a request for a query from a reporting application.

13. A non-transitory computer program product, tangibly embodied on a computer-readable medium, the product comprising instructions to cause a data processing apparatus to perform operations comprising:

periodically sending a first request from an upload control component of a business intelligence system to a control table of an online transaction processing system for a query of the online transaction processing system, the query being performed to provide one or more indications of one or more data updates available at the online transaction processing system;

receiving at the upload control component of the business intelligence system a list identifying one or more data updates in response to the first request, the one or more data updates being contained within at least one data source of the online transaction processing system;

sending a second request from one or more data storage objects of the business intelligence system to the at least one data source of the online transaction processing system for the one or more data updates in response to receiving the list;

receiving at the one or more data storage objects of the business intelligence system the one or more data updates of the at least one data source in response to the second request; and updating data in the one or more data storage objects of the business intelligence system with the one or more data updates of the at least one data source in response to receiving the one or more data updates from the at least one data source.

14. The method of claim 5, wherein the storing further comprises at least one saving operation performed by one or more applications of the source system.

15. The method of claim 1, wherein when one or more data updates are not available data is requested directly from the one or more data storage objects in response to the first request.

16. The method of claim 1, wherein the upload control component of the target system causes only those one or more data storage objects that correspond to an at least one data source containing one or more data updates to request one or more data updates.

17. The product of claim 9, the operations further comprising:

storing in the control table the one or more indications of the one or more data updates in response to a change in one or more object instances contained in the at least one data source of the source system; and removing the one or more indications of the one or more data updates from the control table when the target system has received the one or more data updates.

18. The method of claim 17, wherein the storing further comprises at least one saving operation performed by one or more applications of the source system.

* * * * *